Jan. 4, 1944. L. R. NELSON 2,338,665
METHOD OF PRODUCING COUPLING PARTS
Filed Feb. 3, 1941
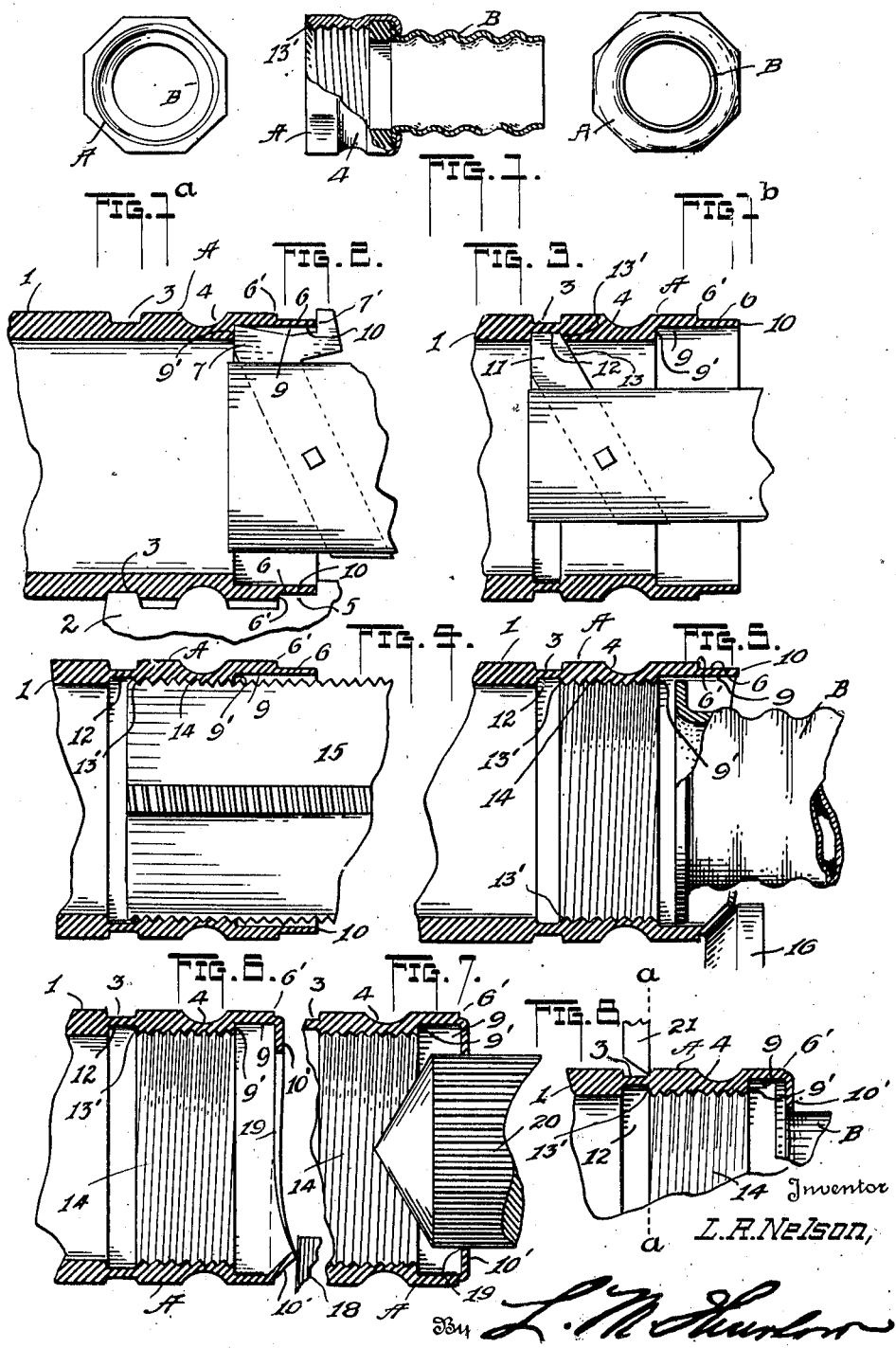
Inventor
L. R. Nelson,
By L. M. Hunton
Attorney Patented Jan. 4, 1944

2,338,665

UNITED STATES PATENT OFFICE 2,338,665

METHOD OF PRODUCING COUPLING PARTS

Lewen R. Nelson, Peoria, Ill.

Application February 3, 1941, Serial No. 377,109

8 Claims. (Cl. 29—157)

This invention pertains to a method of manufacture of hose connector parts, while also pertaining to a method of permanently connecting swivel hose-connector parts with each other.

An object is to provide a method by which certain type of coupling parts may be produced more perfectly than by methods commonly employed while at the same time reducing the cost of manufacture.

Another object is to manufacture in a continuous manner a certain type of hose coupling parts from lengths of material, such as tubing, whereby handling of the parts usually required is avoided.

Still another object is to furnish a new method of permanently connecting assembled hose coupling parts with each other.

The appended drawing forming part hereof illustrates a method of procedure in accomplishing the above objects, wherein—

Figure 1 is a longitudinal section of hose coupling parts one of which parts is of the type herein under consideration and involved in the method to be described.

Figures 1ª and 1ᵇ are respectively left and right end elevations of the structure shown in said Figure 1.

Figure 2 is a longitudinal section of tubular stock from which one of the coupling parts of Figure 1 is to be produced according to the invention, said figure showing two types of tools to initially operate upon said stock during production of a coupling part.

Figure 3 is similar to Figure 2 but wherein another type of tool is provided to operate within and upon another portion of the said part.

Figure 4 is a view similar to part of Figures 2 and 3 showing a threading tool or tap in position for work in the bore of such part.

Figure 5 is likewise similar to Figures 2, 3 and 4 illustrated with and acting upon the part being produced for turning a flanged end thereon.

Figure 6 shows the same part with another tool for completing operation on said flange.

Figure 7 shows a reaming tool applied to the flange shown in Figure 6 for centralizing the opening therein.

Figure 8 is similar to the foregoing figures wherein a final but incidental cutting-off operation is illustrated.

Preliminary to describing my method it may be stated that heretofore the internally threaded female portion of a hose coupling, or that portion shown at the left in Figure 1, has been made from a single piece of material, as brass, the same being operated upon by various dies to produce the finished article. This method required much handling in that it was required to pass the unit by hand from die to die, thus consuming much time and labor, the resultant completed article naturally being somewhat imperfect by reason of such a method.

Further than this, a swivel tubular portion of the coupling or such as that shown at the right in Figure 1 was permanently engaged with the companion part in that figure by further separate and lengthy operations, a more or less imperfect result appearing in the completed article.

My purpose herein is to operate upon a length of round or octagonal tubular stock material, for example, to completely form the part first named above, and when completed to separate it from the length of stock whereupon it is finished as a perfect article ready for use.

Also, where it is desired to permanently connect one part to second part, that, prior to the severance of the first named part from the stock material, said second part may be inserted therein and the two then permanently connected, the act of severance afterward being brought about, all operation being perfectly coordinated by which a complete thoroughly efficient coupling is the result having no defects that might interfere with proper and smooth operations while in use on a hose.

Since the operations are all automatic they are all identical for each produced part.

In the drawing a length of tubular stock 1 as a whole is shown, this being grasped and rotated in a suitable chuck, not shown, and through which it is shiftable lengthwise step by step as the work of producing the desired parts proceeds, one of such parts being denoted at A in Figure 1.

In Figure 2 while the stock is in rotation a cutting tool 2 suitably carried and operated is shifted in a lateral direction against the outer surface of the work at substantially the position shown which serves to produce an annular groove 3 which for later convenience, only, cuts partially through the wall of such work. The tool may also create a groove 4 if desired, for ornamental purposes, as well as to reduce the bulk of the metal. While these grooves need not necessarily be provided, they are preferable for the purposes named. More important, however, is the fact that since the thickness of the wall of the stock being machined is such that it can readily receive the usual heavy threads to be produced later in the process, and for other reasons that will become apparent, the thickness of the stock does not lend itself to ready ductility as a requirement in further operations in completing the article. That the wall may be reduced in thickness, therefore, for the named purpose the tool 2 may have an edge 5 to engage the outer wall of the tool for producing an annular end portion 6 constituting a portion of reduced diameter which extends from the outer free end of the stock inward along the latter for a desired distance, the purpose of which will appear later.

In Figure 2, also, is shown a tool 7 as part of a boring bar 8, for example. This tool removes the metal from within the bore of the wall at a position opposite the end portion 6, and creates a counter-bore 9 leaving a radially extending face 9' constituting an abutment, said counter-bore extending somewhat farther from the said outer free end, by preference, than does said end portion 6. The end portion 6 and counter-bore 9 thus leave an extended shell portion 10 at the immediate end of said work which can be readily acted upon in changing its relation to the work to create an inwardly extending flange 10' as will also appear later herein.

As a further step, in Figure 3 is a tool 11, suitably carried and operated. This tool is introduced into the bore of the work and by lateral movement imparted thereto toward and against the wall of the bore produces an annular groove 12 in the work opposed to the groove 3. This groove 12 reduces the thickness of the wall at this position, thus providing later for more readily separating the part being created from the stock material. But said tool 11 has a more important purpose. It is observed that it has an angular cutting edge at 13 to produce an angular face 13' within said groove 12, which face creates a cone, and is that appearing in Figure 1, and serves to guide into the threads of the part in that figure any usual and well known threaded male coupling part, not shown.

Another operation, as shown in Figure 4, is to provide threads 14 within the bore of the work by the insertion of a threading tool or die 15, without, however, obliterating the face 9' in the counter-bore 9.

In creating coupling parts for hose connection it is sometimes desired to provide a connector complete as in Figure 1, the parts of which cannot be separated yet allowing them to turn with respect to each other. It is also sometimes desired to provide the parts separately and assemble them by hand as needed. When the parts are to be assembled at will, therefore, the part A is carried to completion by first turning the shell portion 10 downward and inward by a spinning operation, for example, to create the flange 10' of Figures 6 and 7. The step of turning the flange appears in Figure 5 wherein a tool 16 having an angular face 17, for example, is shown in the act of creating said flange by being brought with pressure against the end 10 of the said shell portion 6 and carrying such portion to the angular position shown whereupon it may be further acted upon to place its plane perpendicular to the bore of the work by pressure of a tool 18 as in Figure 6. Or, the one tool 16 alone, perhaps, may be employed to accomplish the entire flange forming act.

Figure 7 illustrates the completed flange, the wall of the resultant bore 19 of which is now engaged by a reaming tool 20 to centralize said bore. The part being produced is now complete, as A in Figure 1, and may be severed from the parent stock 1 by a parting-tool or cutting-off tool 21 at the position shown in broken line a—a in Figure 8, the previously created formed grooves 3 and 12 allowing this last act to be more quickly accomplished.

If, now, the complete coupling as in Figure 1 is to be formed by the two connected parts A, B, the described step of separating the fabricated part A from the stock 1 is delayed and a previously produced part B is introduced into the bore of the work as in Figure 5 prior, of course, to creating the flange 10'. After such introduction the tool 16 is now applied followed by the application of the tool 18, as already described, and the severing of the part A from the stock, producing the article as shown complete in Figure 1.

The centralizing of the bore of the flange 10' by the tool 20 is done, of course, only when the part A is to be produced as a separate part, i. e., when it is not intended to have permanent connection with the part B.

When the two said parts are to be connected, however, the face of the projecting extremity of the shell portion 10 may be trued, if desired, by an edge 7' of the tool 7, but, of course, a separate tool may be employed for that purpose.

Naturally, whether the part A is to be separate from the part B, or the two are to be connected, the recess created between the flange 10' and the abutment face 9' of said A serves to receive the usual rubber packing ring C of Figure 1 as well as to receive the flange of the part B when the parts A, B are to be joined.

In connection with forming the named flange 10' it is to be stated that in creating the annular reduction 6, the edge 5 of the tool 2, or any other type of tool that may be employed, creates, or, more properly, perhaps, leaves a shoulder 6' at the inner terminus of said recess which lies substantially opposite the plane of the inner surface of the said flange 10', or at least in such spaced relation to the plane of the face 9' that the packing ring will freely lie between said face and said flange. This is provided at a point just outward from which the material bends or "breaks" in the flange creating step so that the recess created by the counter-bore 9 for the packing ring C is, and must be, always of a fixed width or such as to properly receive said ring, or to receive both the ring and the flange of the part B. That is to say, since the shoulder 6' fixes the "breaking" point and since it is always in the same relative position with respect to the position of the face 9' of the counter-bore all the created parts A will be uniform as compared with parts produced heretofore by less efficient methods.

While the employment of tubular stock is preferable from the standpoint of economy of operations and material it is nevertheless true that solid stock might be used but would require a lengthy boring act to prepare the stock for my purpose.

My method contemplates the processing of such solid stock, however, wherein a proper boring tool may remove the bulk of the metal to create the tubular or shell form for the final machining already described and any such boring tool may be of such form that while providing the main bore, may at the same operation create the counter-bore 9.

While this final machining has the preferable step of creating the angular face 13' for the ready guidance into the part the mentioned male hose portion, not shown, such step may not be brought about.

It may be stated further that the threading operation may perhaps be performed at another period from that stated herein, and from the opposite end from that stated and shown.

With respect to the member B it is to be understood that the diameters of the tubular portion thereof vary considerably in such parts to adapt them to hose-bores of different diameters. Where a tubular portion is much smaller than that shown in Figures 1 and 8 the flange 10' at its bore cannot hold the member in a central position. The flanges of the members, whatever the size of the tubular parts, are therefore always of a diameter to snugly fit within any given diameter of counter bore 9 so that the said tubular part will always be centralized thereby within the bore of the said flange 10', and therefore preferably central with respect to the bore of the part A.

The operations described may be made on an automatic machine so that all such operations will be uniform thus producing any number of the parts A uniformly perfect.

Naturally those steps that precede the step of creating the turned flange 10' may not necessarily follow each other in the order or sequence herein described, such order having been described solely for the purpose of giving an example of the acts to be performed.

I claim:

1. In a method of producing hose connector parts, the steps which comprise treating one end portion of a length of tubular stock material by cutting away the wall thickness from the extreme end for a distance along the length of the tubular stock to enlarge the bore thereof and thereby forming at the inner end of said enlarged bore a terminal abutment face lying at an angle intersecting the axis of the bore, introducing a tool further into said bore to a position beyond and spaced from said abutment face and creating a recess thereby in the wall of the bore, said recess having a wall extending inwardly toward said bore, the depth of the cut at said recess having an internal diameter greater than the diameter of the bore area between said recess and said abutment face forming threads in the surface of the bore in the area between said recess and said abutment face, applying a tool and pressure against said end of said tubular stock and drawing the wall thereof toward the bore into a plane lying substantially at right angles to the axis of said bore to constitute a flange, severing said stock material by a cut applied to the exterior at a point opposite said recess, and thereafter repeating said treatment in the same sequence of steps on that end of the tubular stock material resulting from said severing.

2. In a method of producing hose connector parts, the steps which comprise treating one end portion of a length of tubular stock material by cutting away the wall thickness from the extreme end for a distance along the length of the tubular stock to enlarge the bore thereof and thereby forming at the inner end of said enlarged bore a terminal abutment face lying at an angle intersecting the axis of the bore, introducing a tool further into said bore to a position beyond and spaced from said abutment face and creating a recess thereby in the wall of the bore, said recess having a wall directed inwardly toward said bore, the depth of the cut at said recess having an internal diameter greater than the diameter of the bore area between said recess and said abutment face forming threads in the surface of the bore in the area between said recess and said abutment face, applying a tool and pressure against said end of said tubular stock and drawing the wall thereof toward the bore into a plane lying substantially at right angles to the axis of said bore to constitute a flange, and severing said stock material by a cut applied to the exterior at a point opposite that end of the wall which extends inwardly farthest from said enlarged bore.

3. In a method of producing hose connector parts, the method which comprises rotating a length of tubular stock on its lengthwise axis, treating one end of said stock by cutting away the wall thickness to enlarge the bore of said stock at that end and thereby forming at the inner end of said enlarged bore a terminal abutment face lying at an angle intersecting the axis of the bore, introducing a tool further into said bore to a position beyond and spaced from said abutment face and creating a recess thereby in the wall of the bore, said recess having a wall extending diagonally to the axis of the bore and directed inwardly toward said bore and toward the end of the material into which said tool is introduced, the depth of the cut at said recess having an internal diameter greater than the diameter of the bore area between said recess and said abutment face forming threads in the surface of the bore in the area between said recess and said abutment face, applying a tool and pressure against said end of said tubular stock and drawing the wall thereof toward the bore into a plane lying substantially at right angles to the axis of said bore to constitute a flange, and severing said stock material by a cut applied to the exterior at a point opposite said recess.

4. In a method of producing hose connector parts, the method which comprises rotating a length of tubular stock on its lengthwise axis, treating one end of said stock by cutting away the wall thickness to enlarge the bore of said stock at that end and thereby forming at the inner end of said enlarged bore a terminal abutment face lying at an angle intersecting the axis of the bore, introducing a tool further into said bore to a position beyond and spaced from said abutment face and creating a recess thereby in the wall of the bore, said recess having a wall extending diagonally to the axis of the bore and directed inwardly toward said bore and toward the end of the material into which said tool is introduced, the depth of the cut at said recess having an internal diameter greater than the diameter of the bore area between said recess and said abutment face forming threads in the surface of the bore in the area between said recess and said abutment face, applying a tool and pressure against said end of said tubular stock and drawing the wall thereof toward the bore into a plane lying substantially at right angles to the axis of said bore to constitute a flange, severing said stock material by a cut applied to the exterior at a point opposite said recess, and thereafter repeating said treatment in the same sequence of steps on that end of the tubular stock material resulting from said severing.

5. In a method of producing hose connector parts, the method which comprises rotating a length of tubular stock on its lengthwise axis, treating one end of said stock by cutting away the wall thickness to enlarge the bore of said stock at that end and thereby forming at the inner end of said enlarged bore a terminal abutment face lying at an angle intersecting the axis of the bore, introducing a tool further into said bore to a position beyond and spaced from said abutment face and creating a recess thereby in the wall of the bore, said recess having a side wall directed inwardly toward said bore and toward the end of the material into which said tool is introduced, reducing the outer diameter of the end portion of said tubular stock for a portion only of the length of said enlarged bore and thereby forming an outer shoulder between the end of said stock and said terminal abutment face to constitute an annular zone for determination of the location of a subsequent bend, forming threads in the surface of the bore in the area between said recess and said abutment face, applying a tool under pressure against the end portion of said tubular stock near said outer shoulder and using said outer shoulder to determine the location of the bend and drawing the wall thereof toward the bore into a plane lying substantially at right angles to the axis of said bore to constitute a flange spaced away from said abutment face and located immediately adjacent said annular outer shoulder, severing said stock material by a cut applied to the exterior at a point opposite said recess, and thereafter repeating said treatment in the same sequence of steps on that end of the tubular stock material resulting from said severing.

6. In a method of producing hose connector parts, the method which comprises rotating a length of tubular stock on its lengthwise axis, treating one end of said stock by cutting away the wall thickness to enlarge the bore of said stock at that end and thereby forming at the inner end of said enlarged bore a terminal abutment face lying at an angle intersecting the axis of the bore, introducing a tool further into said bore to a position beyond and spaced from said abutment face and creating a recess thereby in the wall of the bore, said recess having a wall directed inwardly toward said bore and towards the end of the material into which said tool is introduced, providing an annular groove in the outer surface of said tubular stock material in a position opposite to said recess in the inner wall of the bore thereof, forming threads in the surface of the bore in the area between said recess and said abutment face, cutting the outer surface of said stock for a portion only of the length of said enlarged bore to form an annular shoulder on the exterior between the end of the stock and said abutment face, and spaced from the latter and constituting an annular zone for determination of the location of a subsequent bend, applying a tool and pressure against the end portion of said tubular stock and bending the wall thereof toward the bore into a plane lying substantially at right angles to the axis of said bore to constitute a flange so that the inner face extends substantially in the same plane with said shoulder, said bending of the wall being characterized by the use of said outer shoulder to determine the location of the bend, severing said stock material by a cut applied to the exterior at a point opposite said recess, and thereafter repeating said treatment in the same sequence of steps on that end of the tubular stock material resulting from said severing.

7. In a method of producing hose connector parts, the steps which comprise, treating one end portion of length of tubular stock by cutting away the wall thickness from the extreme end for a distance along the length of the tubular stock to enlarge the bore of said stock at that end and thereby forming at the inner end of said enlarged bore a terminal abutment face lying at an angle intersecting the axis of the bore, introducing a tool further into said bore to a position beyond and spaced from said abutment face and creating a recess thereby in the wall of the bore, said recess having a wall directed inwardly toward said bore, reducing the outer diameter of the end portion of said tubular stock for a portion only of the length of said enlarged bore and thereby forming an outer shoulder between the end of said stock and said terminal abutment face to constitute an annular zone for determination of the location of a subsequent bend, forming threads in the surface of the bore in the area between said recess and said abutment face, applying a tool under pressure against the end portion of said tubular stock near said outer shoulder and using said outer shoulder to determine the location of the bend and drawing the wall thereof toward the bore into a plane lying substantially at right angles to the axis of said bore to constitute a flange spaced away from said abutment face and located immediately adjacent said annular outer shoulder, severing said stock material by a cut applied to the exterior at a point opposite said recess, and thereafter repeating said treatment in the same sequence of steps on that end of the tubular stock material resulting from said severing.

8. In a method of producing hose connector parts, the method which comprises rotating a length of tubular stock on its lengthwise axis, treating one end of said stock by initially cutting away the wall thickness to enlarge the bore of said stock at that end and thereby forming at the inner end of said enlarged bore a terminal abutment face lying at an angle intersecting the axis of the bore, introducing a tool further into said bore to a position beyond and spaced from said abutment face and creating a recess thereby in the wall of the bore, said recess having a side wall directed inwardly toward said bore, reducing the outer diameter of the end portion of said tubular stock for a portion only of the length of said enlarged bore and thereby forming an outer shoulder between the end of said stock and said terminal abutment face to constitute an annular zone for determination of the location of a subsequent bend, forming threads in the surface of the bore in the area between said recess and said abutment face, applying a tool under pressure against the end portion of said tubular stock near said outer shoulder and using said outer shoulder to determine the location of the bend and drawing the wall thereof toward the bore into a plane lying substantially at right angles to the axis of said bore to constitute a flange spaced away from said abutment face and located immediately adjacent said annular outer shoulder, severing said stock material by a cut applied to the exterior at a point opposite said recess, and thereafter repeating said treatment in the same sequence of steps on that end of the tubular stock material resulting from said severing, the innermost face of said recess constituting the bore of the next portion of tubular stock to be treated whereby the next step comprising the enlarging of said bore as initially specified herein is performed by cutting away the wall thickness of the innermost face of said recess.

LEWEN R. NELSON.